Figure 2:
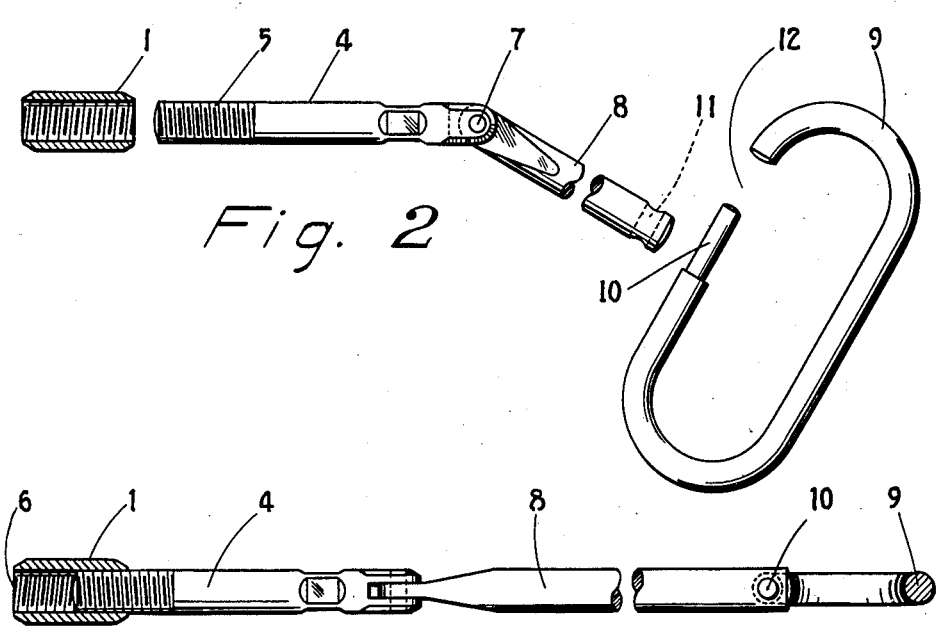

March 7, 1950 — H. KAYFETZ — 2,499,758

WHEEL MOUNTER

Filed Aug. 20, 1948

INVENTOR.
Harry Kayfetz
BY Stewart Blackman
Atty

Patented Mar. 7, 1950

2,499,758

UNITED STATES PATENT OFFICE 2,499,758

WHEEL MOUNTER

Harry Kayfetz, Miami, Fla.

Application August 20, 1948, Serial No. 45,418

4 Claims. (Cl. 29—273)

The invention relates to a wheel mounter.

The wheel mounter to which the invention is particularly applicable is of the type having utility in the removal or replacement of a motor vehicle wheel, but is not limited, within the purview of the invention, to a vehicle of any specific class or to a specific type of wheel.

An object of the invention is to provide a wheel mounting and demounting device which will be simple in construction and convenient in application to a conventional wheel assembly.

Another object of the invention is to provide a device of the character and for the purposes described, which may be readily and economically manufactured.

A further object is to provide a wheel mounter which will be compact in assembly to permit the convenient stowage thereof.

Other advantages of my invention will be apparent as the description thereof proceeds.

According to the invention, the wheel mounter comprises a socket threaded for engagement with a wheel stud of a stud assembly securing the wheel to the drum structure, and an inclinable shaft connected to the socket, this shaft forming a normally horizontal wheel supporting member and an inclinable extension thereto so as to permit the wheel to be slideable from the supporting member to the extension, in the removal of the wheel, and from the extension to the supporting member in the replacement thereof. The shaft terminates in a detachable handle functioning as a temporary stop to prevent the wheel from falling off the shaft in the manipulation thereof.

Figure 1:
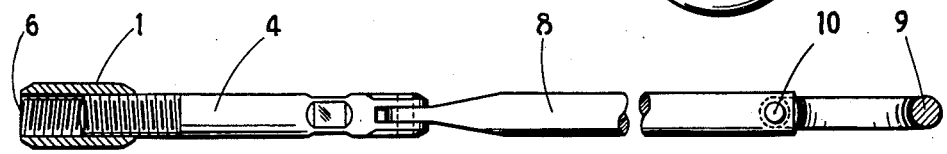
Figure 4:
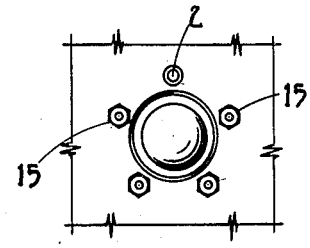
Figure 3:
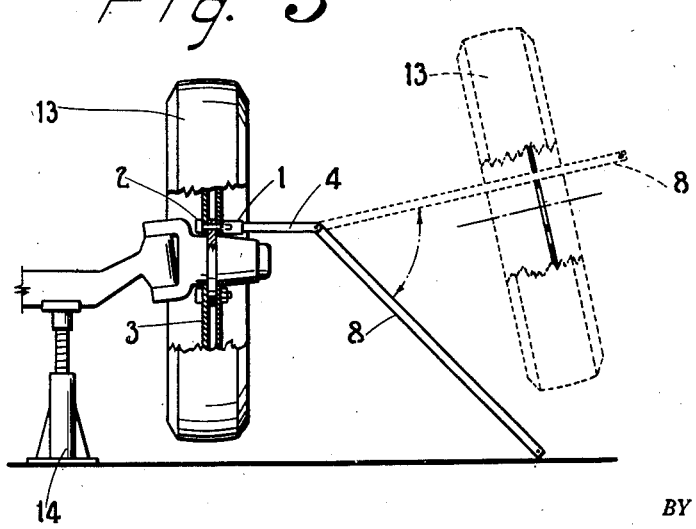

The invention is embodied in a wheel mounter exemplified in the accompanying drawing in which the views are as follows, like reference numerals designating identical parts throughout the several views:

Fig. 1, the wheel mounter in plan;

Fig. 2, the device in side elevation;

Fig. 3, a side elevation of the device in its application to the stud fastening whereby the wheel is secured to the drum supporting structure;

Fig. 4, an elevation, in part, of a wheel supporting stud assembly.

The wheel mounter has a socket 1, threaded for engagement with a stud 2, of the conventional fastening stud assembly whereby the wheel is secured to the hub drum structure, shown generally at 3.

Threadably secured to the socket 1, is a shaft 4 which is threaded, as at 5, in any suitable manner to engage the socket in its outer end, leaving a stud-engaging portion 6 at its opposite end.

The shaft 4 is pivoted by a pivot pin 7 to an inclinable extension 8, adapted to pivot in relation to shaft 4 for a purpose to be presently described.

At its outer extremity, the inclinable extension 8 is fitted with a detachable loop forming a handle 9. This handle has a pin 10 formed therein which is adapted to engage a slot 11 bored diametrically through the outer end of extension 8 whereby to detachably secure the handle thereto. A gap portion 12 is provided in the handle loop to permit the passage thereof over the end of extension 8 in the attachment or detachment of the handle in relation thereto.

This construction provides a hand receiving loop defined by the handle 9 the front bar of which functions as a stop member to receive thereagainst the inadvertent slipping of a wheel along the extension 8, and thus provides a guard member for the operator's hand. The rear bar of this loop functions as a hand grip for the manipulation of the wheel mounter.

In practice, the wheel 13 having been elevated by the usual means of a jack 14, for removal from drum structure 3, one of the fastening nuts 15 is first removed with a suitable wrench in the customary manner, leaving the stud 2 exposed.

The wheel mounter is then applied to stud 2, by engaging the socket 1 therewith. The remaining nuts are next removed from their studs, the wheel mounter being kept in engagement with stud 2.

The wheel is then moved onto the shaft 4 for temporary support thereby, and extension 8 is inclined downwardly until the handle end thereof is resting on the ground as illustrated by the full line position of the extension in Fig. 3. The wheel may then be worked from shaft 4 to the downwardly inclined extension 8, permitting the wheel to slide therealong until its deposit on the ground.

To mount a wheel on the drum structure, the extension 8 has the wheel passed thereover through one of the mounting openings therein, the socket 1 having first been attached to the top stud 2. By means of handle 9, which has been connected to extension 8, the wheel is elevated by raising extension 8 in pivotal movement as illustrated by its dotted line position in Fig. 3. The wheel is then worked down the inclined extension and onto shaft 4, being easily fitted upon the studs after registration of the studs with the mounting openings, as will be understood. The securing nuts are then replaced on the studs in any convenient manner and the decorative wheel discs clipped into place.

The handle is normally in attached relation to extension 8, being removable therefrom to permit passage of the wheel over the free end of the extension.

It will be understood that the wheel mounter is applicable to wheel fastenings of a female type, that is to say, where the removable member is the stud and the fixed member has internal threads, as for example, where the wheel is secured by an assembly of studs which are removable from complementary female members fixed to the hub or drum structure. In this application, the socket 1 may be removed from shaft 4 and the threaded end 5 thereof be introduced into the fixed female member for attachment thereto, in a manner which will be apparent from the foregoing description of the invention.

It will likewise be understood that the directional rotation of the threads employed in the invention may vary as required to meet the thread structure of the wheel fastenings to which my invention is applied.

Of course, the invention is susceptible of various minor modifications without departing from the scope thereof.

Having thus described the invention and the modes of its application, what I claim as novel therein and desire to secure by Letters Patent is:

1. A wheel mounter comprising a normally horizontal shaft terminating at its front end in a threaded engaging member for attachment to a wheel fastening, an inclinable extension pivoted to said shaft at the rear end thereof, said extension having a handle socket formed in the rear end portion thereof, a handle detachably connected to said extension at the rear end thereof and defining a hand receiving loop having a frontal bar forming a common stop and hand guard member and a rear bar forming a hand grip for the manipulation of said wheel mounter, said frontal bar including a pin adapted for engagement with said handle socket whereby to detachably secure said handle to said extension.

2. A wheel mounter comprising a normally horizontal shaft terminating at its front end in a threaded portion, an internally-threaded socket member threadably connected to said threaded portion and removable therefrom, an inclinable extension pivoted to said shaft at the rear end thereof, a handle detachably connected to said extension at the rear end thereof, said handle defining a hand receiving loop having a frontal bar forming a common stop and hand guard member and a rear bar forming a hand grip for the manipulation of said wheel mounter, and means to couple said handle to said extension in detachable relation thereto.

3. A wheel mounter comprising a normally horizontal shaft terminating at its front end in a threaded portion and a socket member threadably connected thereto and removable therefrom, an inclinable extension pivoted to said shaft at the rear end thereof, said extension having a handle socket formed in the rear end portion thereof, a handle detachably connected to said extension at the rear end thereof and defining a hand receiving loop having a frontal bar forming a common stop and hand guard member and a rear bar forming a hand grip for the manipulation of said wheel mounter, said frontal bar including a pin adapted for engagement with said handle socket whereby to detachably secure said handle to said extension.

4. In a handle for a wheel mounter of the character described, said wheel mounter comprising a normally horizontal wheel fastening engaging shaft and an inclinable extension pivotably connected thereto and having a handle receiving socket formed at the rear end thereof, said handle defining a hand receiving loop having a frontal bar to form a common stop and guard member and a rear bar forming a hand grip for the manipulation of said wheel mounter, said frontal bar including a pin in axial alinement therewith and adapted for engagement with said handle receiving socket, said pin being of relatively reduced cross-section to form a shoulder at the junction thereof with said frontal bar for the operative support of said extension, and said pin terminating in axially spaced relation to said frontal bar at the end thereof opposite said shoulder to form a slot for the reception of said extension to permit the passage of said pin into said socket whereby to detachably couple said handle to said extension.

HARRY KAYFETZ.

REFERENCES CITED

The following references are of record in the file of this patent:

UNITED STATES PATENTS

| Number | Name | Date |
|---|---|---|
| 1,494,269 | Meyers | May 13, 1924 |
| 1,506,694 | Toffey | Aug. 26, 1924 |
| 1,815,821 | Baker | July 21, 1931 |
| 2,340,986 | Roberts et al. | Feb. 8, 1944 |
| 2,401,399 | Akers | June 4, 1946 |

FOREIGN PATENTS

| Number | Country | Date |
|---|---|---|
| 47,296 | Denmark | May 8, 1933 |
| 686,360 | France | Apr. 14, 1930 |
| 702,461 | France | Jan. 26, 1930 |